United States Patent
Guo et al.

(10) Patent No.: US 9,247,463 B1
(45) Date of Patent: Jan. 26, 2016

(54) SYSTEMS AND METHODS FOR PROVIDING MOBILE APPLICATION ACCESS OVER NON-MOBILE DATA CHANNELS

(71) Applicant: LotusFlare, Inc., Fremont, CA (US)

(72) Inventors: Qing Guo, Mountain View, CA (US); Guogang Li, San Jose, CA (US); Shao Yong Xia, Fremont, CA (US)

(73) Assignee: LOTUSFLARE, INC., Fremont, CA (US)

( * ) Notice: Subject to any disclaimer, the term of this patent is extended or adjusted under 35 U.S.C. 154(b) by 0 days.

(21) Appl. No.: 14/730,197

(22) Filed: Jun. 3, 2015

Related U.S. Application Data (60) Provisional application No. 62/075,721, filed on Nov. 5, 2014.

(51) Int. Cl.
*H04W 36/00* (2009.01)
*H04W 36/36* (2009.01)
*H04W 4/00* (2009.01)
*H04M 1/725* (2006.01)

(52) U.S. Cl.
CPC ...... *H04W 36/0022* (2013.01); *H04M 1/72522* (2013.01); *H04W 4/008* (2013.01); *H04W 36/36* (2013.01)

(58) Field of Classification Search
CPC ......... H04W 4/16; H04W 76/02; H04W 4/14; H04W 88/06; H04W 4/18; H04W 12/06; H04W 4/24; H04W 48/18
See application file for complete search history.

(56) References Cited

U.S. PATENT DOCUMENTS

| | | | |
|---|---|---|---|
| 2009/0260074 A1* | 10/2009 | De Spiegeleer | 726/15 |
| 2010/0177711 A1* | 7/2010 | Gum | 370/329 |
| 2013/0167252 A1* | 6/2013 | Major et al. | 726/29 |
| 2013/0294386 A1* | 11/2013 | Silver et al. | 370/329 |
| 2014/0148162 A1* | 5/2014 | Maharaj | 455/435.2 |
| 2015/0085823 A1* | 3/2015 | Jain | 370/331 |

* cited by examiner

*Primary Examiner* — Jung Park
(74) *Attorney, Agent, or Firm* — Dergosits & Noah LLP (57) ABSTRACT

Systems and methods are described for providing non-mobile data channel access to a mobile application on a mobile computing device. A request for data may be received, by a client component on the mobile computing device, from the mobile application. The client component may automatically detect that mobile data is unavailable, and may automatically select a non-mobile data channel for the mobile application to communicate to an application server. The automatic selecting may be based on availability of a non-mobile data channel and bandwidth of the available non-mobile data channel. The client component may translate the request for data into a format of the selected non-mobile data channel and transmit the translated request for data to a back-end server via the selected non-mobile data channel.

17 Claims, 10 Drawing Sheets

SYSTEMS AND METHODS FOR PROVIDING MOBILE APPLICATION ACCESS OVER NON-MOBILE DATA CHANNELS

CROSS-REFERENCE TO RELATED APPLICATIONS

This application claims priority to provisional U.S. patent application No. 62/075,721, filed on Nov. 5, 2014 and entitled "Mobile Application Access over Non-Mobile Data Channels" which is incorporated herein in its entirety.

TECHNICAL FIELD

This disclosure relates generally to mobile communications device applications, including, more particularly, to permitting a mobile computing device to communicate with application servers via non-mobile data channels.

SUMMARY OF THE INVENTION

Systems and methods are described for providing non-mobile data channel access to a mobile application on a mobile computing device. A request for data may be received, by the mobile computing device, from the mobile application. The mobile computing device may automatically detect that mobile data is unavailable, and may automatically select a non-mobile data channel for the mobile application to communicate to an application server. The automatic selecting may be based on availability of a non-mobile data channel and bandwidth of the available non-mobile data channel. The mobile computing device may translate the request for data into a format of the selected non-mobile data channel and transmit the translated request for data to a back-end server via the selected non-mobile data channel.

In another embodiment, a server may receive a request for application data, the request being sent by a mobile computing device in a non-mobile data format over a non-mobile data channel. In response to receiving the request for application data, the server may translate the request for application data from the non-mobile data format to an Internet protocol data format. The server may send the translated request for application data to an application server associated with the application data. A response may be received by the server from the application server, the response being sent in a second Internet protocol data format. In response to receiving the response from the application server, the server may translate the response from the second Internet protocol data format to the non-mobile data format, and send the translated response from the server via the non-mobile data channel. Additional embodiments may include pre-caching of application data to facilitate an application's ability to function where the is no mobile data access, implementing the non-mobile data functionality via embedded SDK or by standalone VPN application, and other useful features.

BRIEF DESCRIPTION OF THE FIGURES

This disclosure is illustrated by way of example and not limitation in the figures of the accompanying drawings, in which like references indicate similar elements, and in which.

DETAILED DESCRIPTION

A technology platform to maximize access to mobile Internet, apps and services is described. The mobile application access platform may allow mobile applications to communicate with application servers via non-mobile data channels. Doing so allows mobile applications to continue to operate, even when mobile data connection is not available. Potential non-mobile-data channels may include USSD, SMS, Bluetooth, Voice, speaker/microphone, NFC, and the camera/display of the mobile device. The mobile application access platform may also allow mobile applications to automatically or semi-automatically connect and authenticate to sponsored Wi-Fi hotspots when mobile data is not available, within the interface of the mobile application. Authenticating to sponsored Wi-Fi hotspots may be done in a way that is transparent or/and feels natural to the users using the applications. The mobile application access platform may further provide a mechanism that pre-caches content for a mobile application, and later (e.g., while using the above-described non-mobile data modes) access the cached content.

The mobile application access platform may be particularly helpful to users who are traveling and have mobile data turned off due to cost of roaming data but want to access mobile apps. The described mobile application access platform may also be helpful to users who have mobile phones, but lack access to mobile data coverage. Such users may have access to non-mobile data channels, such as voice and SMS services, but may not have access to mobile data services (i.e. EDGE, 3G, 4G or LTE access). This lack of data coverage can be temporary or permanent. These users want to access mobile apps without having access to mobile data channels. A third group of users who may benefit from the mobile application access platform described herein are users who have prepaid data plans, but have exhausted their data limits. These users may be restricted in their use of mobile data services until they purchase more prepaid data access.

There are many situations in which mobile phone users don't have mobile data connectivity—a) they choose to turn off data due to high cost of roaming data, b) they ran out of their prepaid quota, c) they are in a place where no mobile data coverage is available, etc. However users still want and need to access mobile apps and services, and often more than they normally do in situations where mobile data is available. For example, when someone travels from London and lands in San Francisco, he/she may want to request a car (e.g., via a rideshare mobile application, such as that provided by Uber, Inc. of San Francisco, Calif.), but they don't have roaming data turned on, due to the high expense associated with international data roaming. The mobile application access platform may allow the user to access the Uber app, even without being in communication with a mobile data network, and request a car. In another exemplary embodiment, many mobile game applications may be played in offline mode. However, offline mode may lack functionality compared to when the application has access to mobile data, such as inability to make any in-game purchases or to access any of the social features (such as multiplayer functionality, the ability to post high scores, etc.). The mobile application access platform may permit a user to perform these high-value tasks in a mobile application without the need for mobile data.

Figure 1:
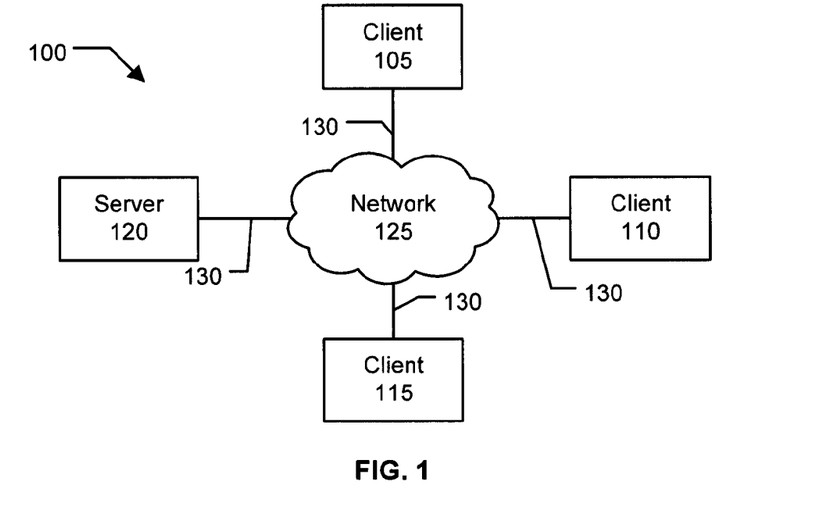
FIG. 1 shows a simplified block diagram of a distributed computing network connecting a server and devices in which a platform for providing non-mobile data access to mobile applications may be implemented.

FIG. 1 is a simplified block diagram of a distributed computer network 100 incorporating a specific embodiment of the present invention. Computer network 100 includes a number of mobile client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 125 is the Internet, in other embodiments, communication network 125 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of a specific embodiment incorporating the present invention and is not intended to limit the scope of the invention as recited in the claims. One of ordinary skill in the art would recognize other variations, modifications, and alternatives. For example, more than one server system 120 may be connected to communication network 125. As another example, a number of mobile client systems 105, 110, and 115 may be coupled to communication network 125 via an access provider (not shown) or via some other server system.

Mobile client systems 105, 110, and 115 typically request information from a server system which provides the information. It should be appreciated, however, that information can generally flow in both directions (e.g., a backup service primarily sends data from clients to server), but the server is the service provider. Server systems by definition typically have more computing and storage capacity than mobile client systems. However, a particular computer system may act as both a client or a server depending on whether the computer system is requesting or providing information. Aspects of the invention may be embodied using a client-server environment or a cloud-cloud computing environment.

Server 120 is responsible for receiving information requests from mobile client systems 105, 110, and 115, performing processing required to satisfy the requests, and for forwarding the results corresponding to the requests back to the requesting mobile client system. The processing required to satisfy the request may be performed by server system 120 or may alternatively be delegated to other servers connected to communication network 125.

Mobile client systems 105, 110, and 115 enable users to access and query information or applications stored by server system 120. A mobile client may be referred to as a distributed mobile client. Some example mobile client systems include but are not limited to portable electronic devices (e.g., mobile communication devices) whose principle function is voice communication including the Apple iPhone®, the Apple iPad®, the Palm Pre™, or any mobile computing device running the Apple iOS™, Android™ OS, Google Chrome OS, Symbian OS®, Windows Mobile® OS, Palm OS® or Palm Web OS™. In a specific embodiment, a "web browser" application executing on a mobile client system enables users to select, access, retrieve, or query information and/or applications stored by server system 120. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 2:
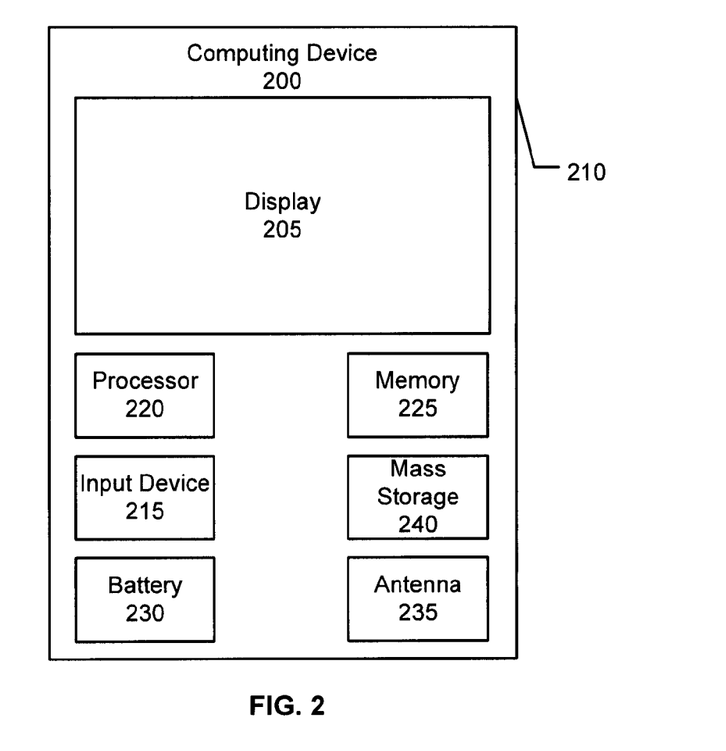
FIG. 2 shows a more detailed diagram of an exemplary mobile communications device.

FIG. 2 shows a specific embodiment of a computer system such as a mobile client system of the present invention. In an embodiment, a user interfaces with the system through a client system, such as shown in FIG. 2. Mobile client communication or portable electronic device 200 includes a display, screen, or monitor 205, housing 210, and input device 215. Housing 210 may house familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like and various combinations thereof. These components may be connected using any interconnection scheme or bus architecture.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or a combination of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The invention may also be used with computer systems having different configurations, e.g., with additional or fewer subsystems. For example, a computer system could include more than one processor (i.e., a multiprocessor system, which may permit parallel processing of information) or a system may include a cache. The computer system shown in FIG. 2 is but an example of a computer system suitable for use with the present invention. Other configurations of subsystems suitable for use with the present invention will be readily apparent to one of ordinary skill in the art.

For example, in a specific implementation, the computing device is a mobile communication device such as a smartphone or tablet computer. Some specific examples of smartphones include the Droid Incredible and Google Nexus One, provided by HTC Corporation, the iPhone or iPad, both provided by Apple, and many others. Typically, these mobile or portable computing devices have less resources (e.g., memory, storage, smaller screens, or processing power) than a desktop computer. Further, such mobile or portable computing devices are designed to be powered primarily by a battery, rather than being constantly plugged in to a power outlet as in the case of a desktop computer. So, given these differences between portable and non-portable computing devices, it is generally desirable that applications on portable computing devices be small and lightweight (e.g., consume relatively fewer resources as compared to non-portable computing devices). The computing device may be a laptop or a netbook. In another specific implementation, the computing device is a non-portable computing device such as a desktop computer or workstation.

A computer-implemented or computer-executable version of the program instructions useful to practice the present invention may be embodied using, stored on, or associated with non-transitory computer-readable medium. Non-transitory computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the present invention may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the invention may be transmitted via wires, radio waves, or through a network such as the Internet. In another specific embodiment, a computer program product including a variety of software program code to implement features of the invention is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the mobile computing device or portable computer device may be connected to a network and may interface to other computers using this network. The network may be an intranet, internet, or the Internet, among others. The network may be a wired network (e.g., using copper), telephone network, packet network, an optical network (e.g., using optical fiber), mobile network, or a wireless network, or any combination of these. For example, data and other information may be passed between the mobile computing device or portable computer and components (or steps) of a system useful in practicing the invention using a mobile network employing a protocol such as code division multiple access (CDMA), Global System for Mobile Communications/General packet radio service (GSM)/(GPRS), Worldwide Interoperability for Microwave Access (WiMAX), or 3GPP Long Term Evolution (LTE) or a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers, or from mobile communications devices to other mobile communications devices.

Figure 3:
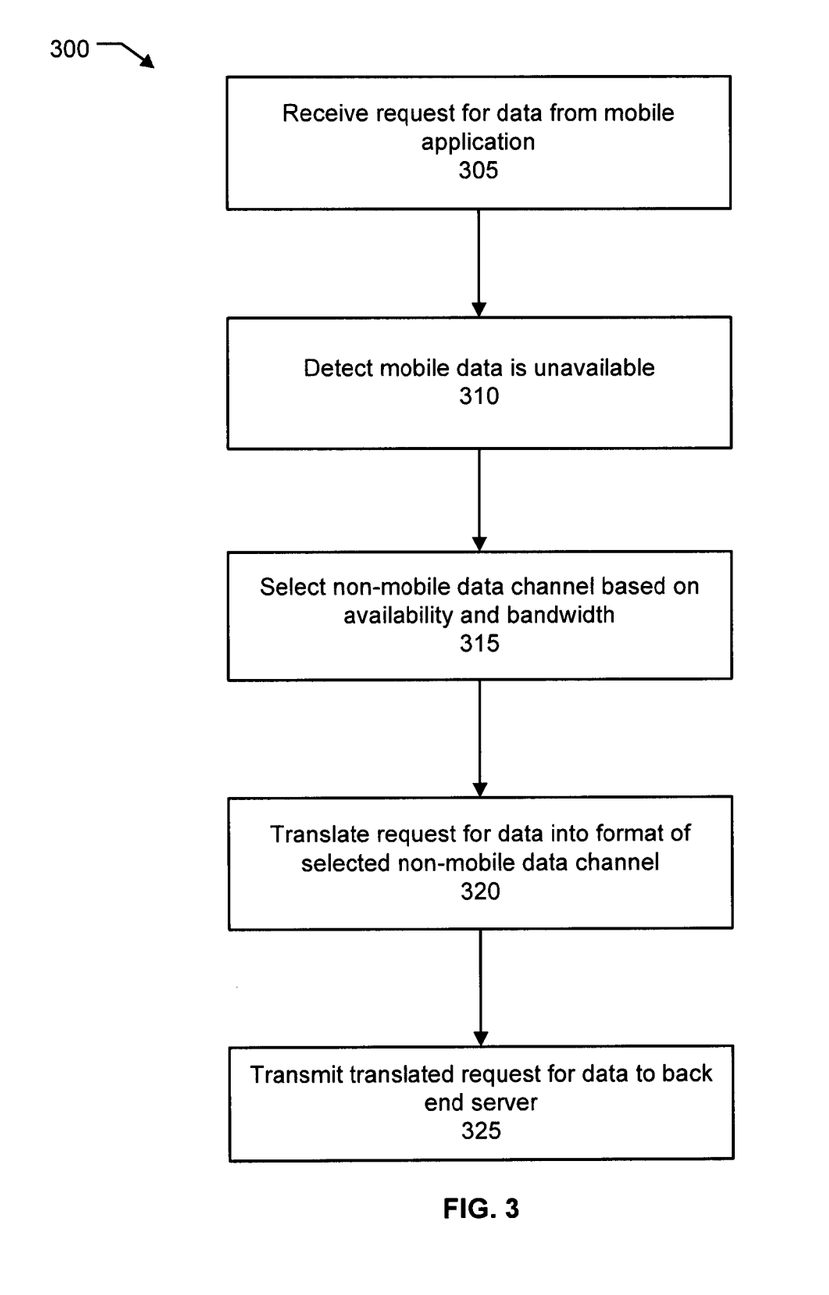
FIG. 3 shows a specific embodiment of a flow diagram for a client component of a platform for providing non-mobile data access to mobile applications.

FIG. 3 shows a specific embodiment of a flow diagram for a method 300 for providing non-mobile data access to mobile applications. At step 305, a request for data from the mobile application may be received at a mobile computing device. A client component of the platform, located on the mobile device, may automatically detect that mobile data is unavailable at step 310. The client component may monitor a connection status of the mobile device, meaning that the client component automatically determines the availability of communication channels (e.g., a mobile data channel, a WiFi channel, etc.). The connection status may be determined by the client component, and/or may be provided by the mobile computing device (e.g., by the client component querying the mobile device operating system or an application running on the mobile computing device).

The client component of the platform may, when mobile data channels are unavailable, for example, automatically select a non-mobile data channel for the mobile application to communicate to an application server at step 315. The automatic selecting may be based on factors such as availability of a non-mobile data channel, bandwidth of the available non-mobile data channel, and cost of the available non-mobile data channel. The availability of a non-mobile data channel may be a binary variable. In an embodiment, non-mobile data channels may be filtered based on the bandwidth requirement of the request, such that any channel that does not meet a bandwidth threshold is eliminated from the selection process. Any non-mobile data channels that meet the bandwidth threshold may then, in the embodiment, be ranked based on cost per bandwidth. The least expensive non-mobile data channel that meets the bandwidth threshold may be selected in some embodiments. The cost associated with a non-mobile data channel may be the monetary rate per unit of data transferred. Furthermore, the cost may be variable based on the location of the mobile computing device, in some embodiments, where the client component has access to a location-based cost for each available non-mobile data channel. The location-based cost for the non-mobile data channels may be provided by the back-end component of the platform, and may be pre-stored by the client component when the mobile computing device has mobile data channels available.

Figure 4:
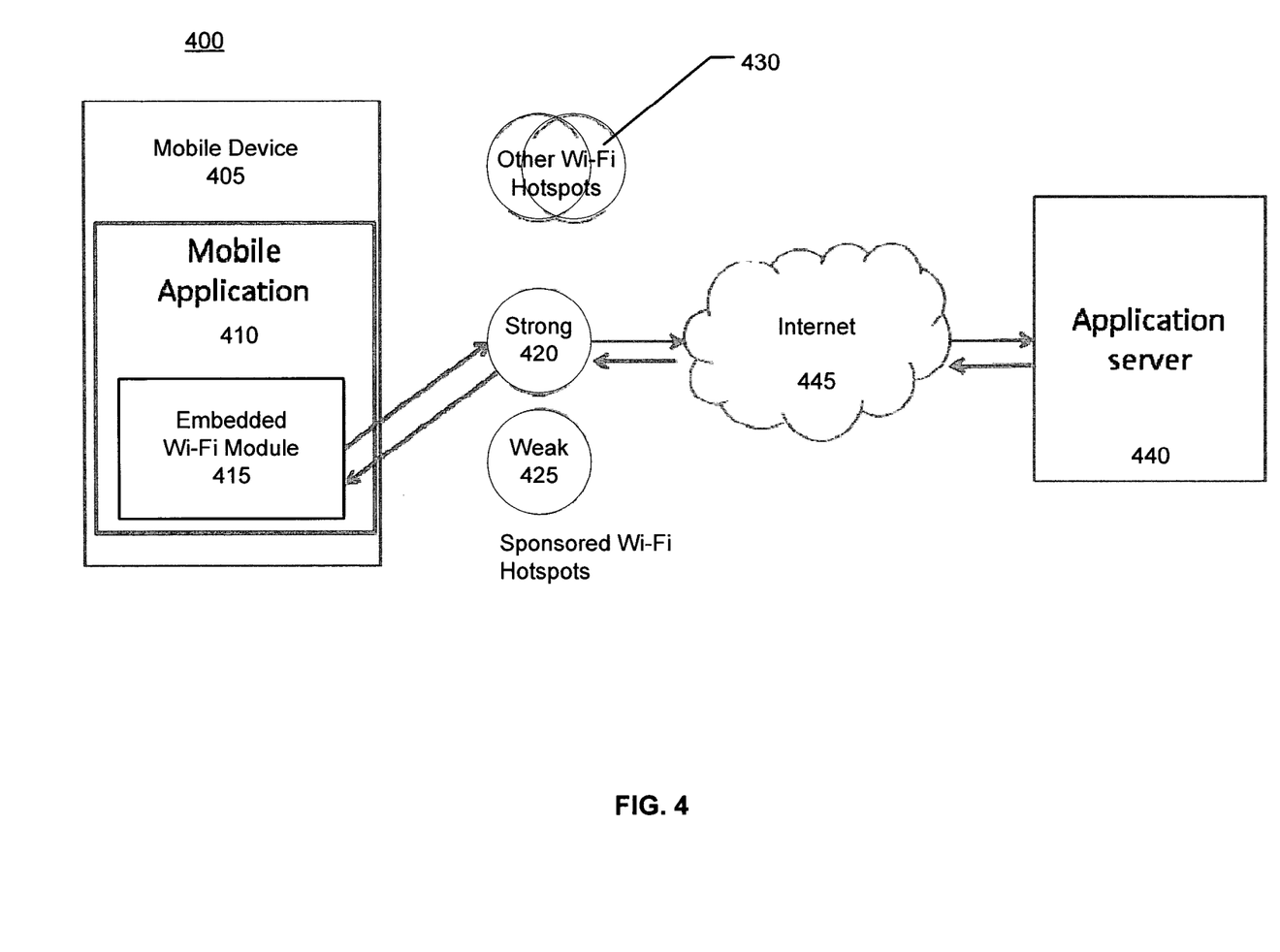
FIG. 4 shows a block diagram illustrating an exemplary embodiment of how the mobile application access platform's Wi-Fi component may function in an exemplary embodiment.

FIG. 4 shows a block diagram illustrating an exemplary embodiment of the mobile application access platform 400, and how the platform's Wi-Fi component may function in an exemplary embodiment. System 400 may include mobile device 405, which include mobile application 410. The mobile application access platform 400 client component may be implemented as an embedded non-mobile data communications module 415 (shown as "embedded Wi-Fi module") in the mobile application 410, or as a standalone mobile application installed on the mobile device 405. For the standalone mobile application embodiment, an internal virtual private network may be set up on the mobile device, which is described in further detail below. The standalone mobile application may be a pre-installed application (i.e., a system-level application installed on the mobile computing device) or an application that the user may download from an application store (i.e., a user-level application). Likewise, the embedded client component 415 may be embedded within the mobile application 410, or as a module within the operating system of the mobile device 405.

If the mobile application access platform module 415 detects that there is an accessible WiFi hotspot close-by it will connect to it to allow applications to continue to function. The mobile application access platform may have a predetermined list of WiFi hotspots that are sponsored, meaning that apps that include the mobile application access platform SDK may access the WiFi hotspot. Via the mobile device OS, a list of all WiFi hotspots may be received. The mobile application access platform may then filter out hotspots 430 that are not sponsored, and display available sponsored WiFi hotspots 420 and 425 within the mobile application. In some embodiments, the certificates and credentials to access the WiFi hotspot may be stored on the mobile application access platform client (SDK integrated in the app, or in a standalone VPN application), so connecting to the sponsored hotspots can happen automatically without user intervention. The mobile application access platform module 415 may select the stronger available sponsored Wi-Fi hotspot 420 to access the application server 440 associated with mobile application 410 via the Internet 445.

There are mobile applications available that help people find hotspots (such as WiFi hotspots) and connect to them. These applications are different from a mobile application access platform client running on a mobile computing device, such as that shown in FIG. 4, in several significant ways. First, conventional applications are usually standalone mobile apps that are not integrated as part of the mobile application users wish to access; the mobile application access platform allows selection of a non-mobile data channel within the application itself and may have features to facilitate this functionality, such as pre-stored credentials allowing access to an otherwise private or pay-only WiFi network. This allows the mobile application access platform to provide a more seamless process to users, and allows more users to take advantage of the sponsored WiFi access (since not everyone will download a standalone mobile app that finds WiFi hotspots). Additionally, often the hotspots conventional applications find are not accessible to everyone. For example, WiFi applications may identify private networks that the user has no way to access, which may be frustrating. The mobile application access platform may limit the options displayed to the user to hotspots that are accessible by the application, sparing a user from the time and effort spent sifting through unavailable WiFi hotspots.

Figure 5:
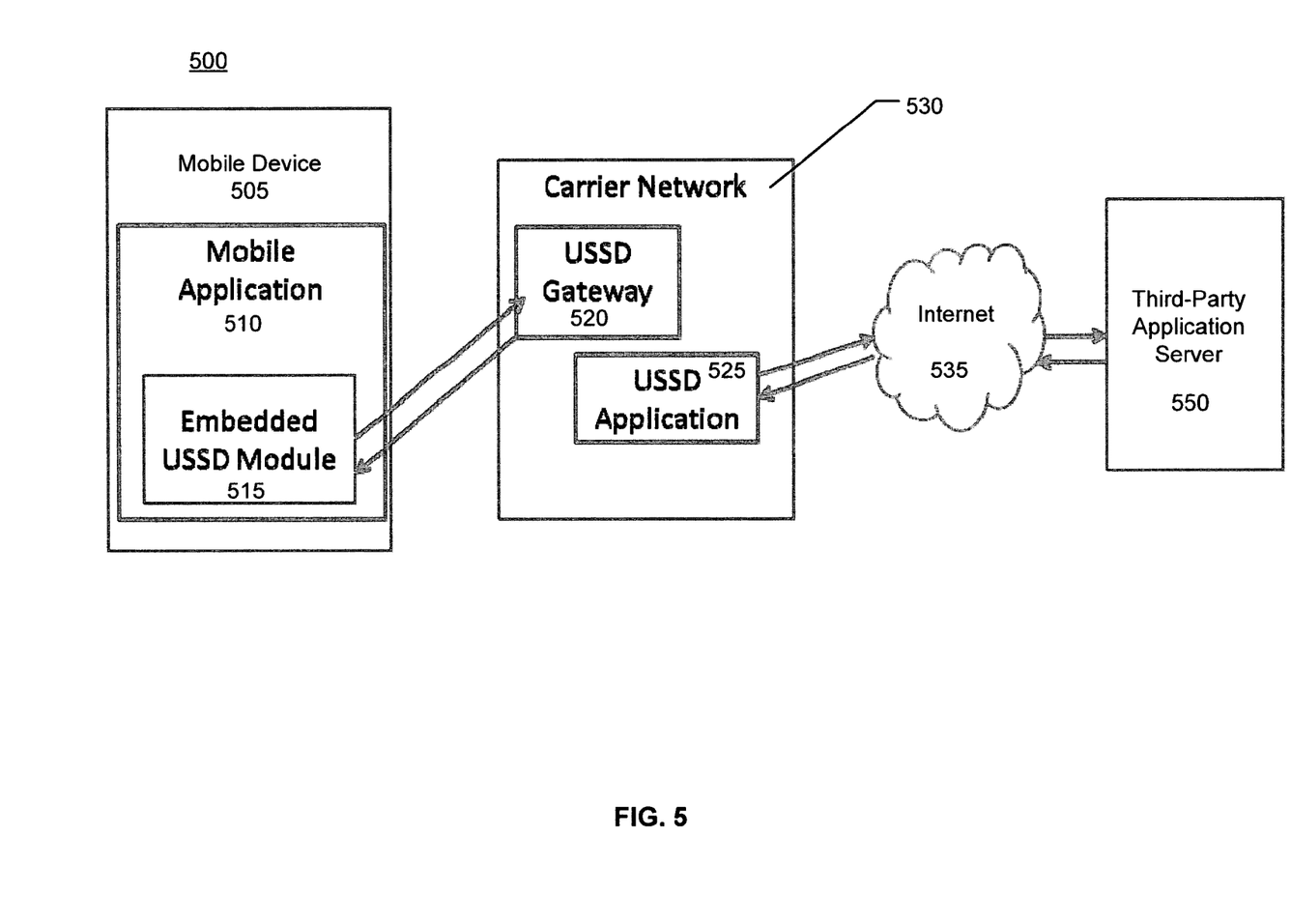
FIG. 5 shows a block diagram illustrating an exemplary embodiment of how the mobile application access platform's USSD component may function in an exemplary embodiment.

If no WiFi is accessible, the mobile application access platform may attempt to establish a USSD channel to an intermediate USSD service cloud. The intermediate USSD service cloud may then act as a proxy to communicate with the application servers hosted on the Internet. FIG. 5 shows a block diagram illustrating an exemplary embodiment of how the mobile application access platform's USSD component may function in an exemplary embodiment.

System 500 may include mobile device 505, which include mobile application 510. The mobile application access platform 500 client may be implemented as an embedded non-mobile data communications module 515 (shown as "embedded USSD module") in the mobile application 510, or as a standalone mobile application. The mobile application access platform may also include a backend component 530 that runs inside a mobile carrier network to receive/parse/relay traffic from the mobile application 510. While the exemplary system 500 is shown using a USSD communication channel, any of the suitable examples of non-mobile data communication may implement the features of system 500 to facilitate non-mobile data access to mobile applications.

The mobile application access platform client component 515 may allow the mobile application to have online functionality via non-mobile data channels when no mobile data channel is available. As such, the client component 515 may substitute a normal data request function call. As stated above, when a request for data through the application is made, the current state of network connectivity is checked. If regular mobile data network access is available, the mobile application 510 will function as it normally does.

If no mobile data network is available, then client component 515 may attempt to send data request through alternative channels. Returning to FIG. 3, the mobile computing device may translate the request for data into a format of the selected non-mobile data channel at step 320 and transmit the translated request for data to a back-end component of the mobile application access platform via the selected non-mobile data channel at step 325. The communication on the alternative channel may be translated between the digital data request and the format of the alternative channel. In the exemplary embodiment of system 500, this would mean that the client component 515 would translate the data request to a USSD format for transmission via the USSD data channel to the USSD gateway 520 of the back-end component 530.

Figure 9:
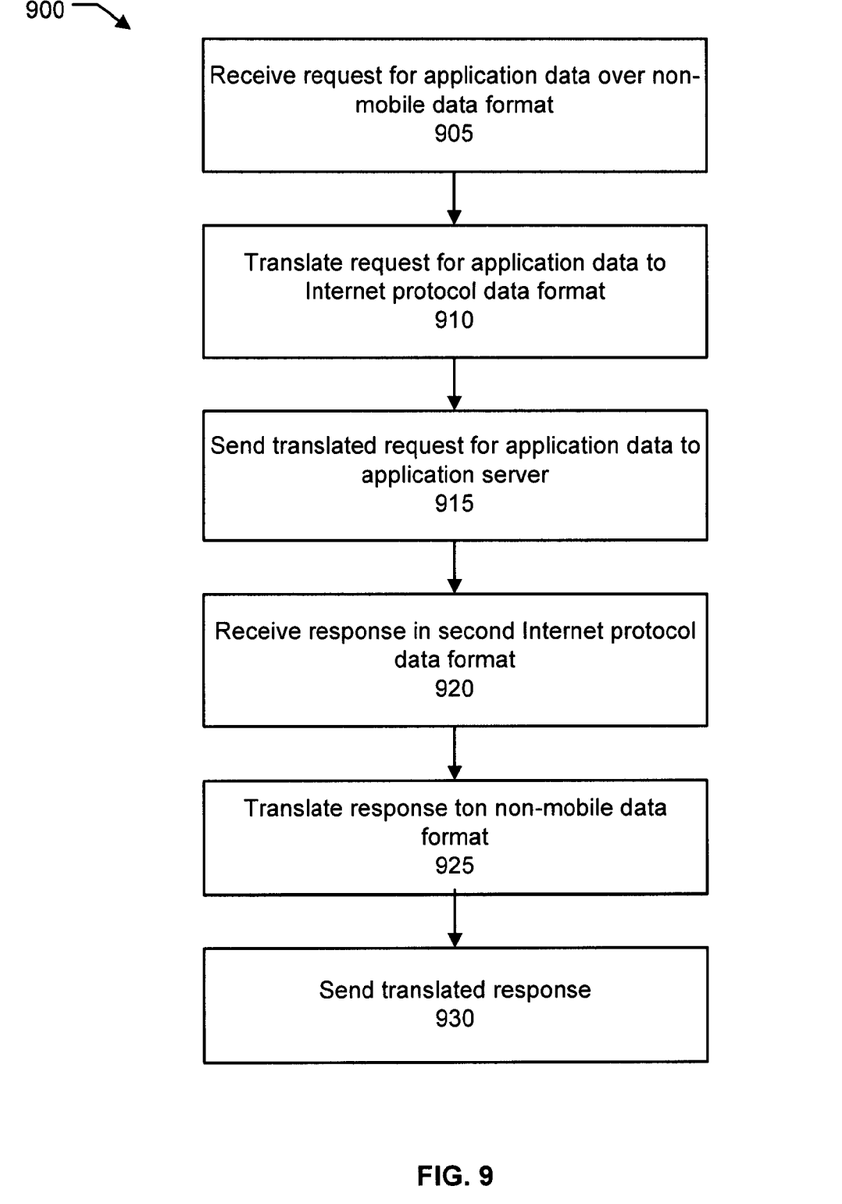
FIG. 9 shows a specific embodiment of a flow diagram for a back-end component of a platform for providing non-mobile data access to mobile applications.

FIG. 9 shows a specific embodiment of a flow diagram for a method 900 for providing non-mobile data access to mobile applications. Method 900 may describe the activity of the back-end component 530 of FIG. 5, for example. The back-end component 530 of the mobile application access platform may run inside a mobile carrier network, and may receive/parse/relay traffic from the mobile application 510 to third-party application server 550. The back-end component 520 may be implemented as a server or set of servers running code that listens to alternative communication channels defined in the mobile application access platform. The back-end component 520 may receive a request on the alternative, non-mobile data channel from a requesting client device 505. The format of the request will be in the format related to the alternative channel (e.g., USSD format for system 500).

Returning to FIG. 9, the back-end component 530 may receive a translated request for application data at step 905, the translated request being sent by the mobile computing device 505 in a non-mobile data format over a non-mobile data channel. For example, the translated request in FIG. 5 may be received by the USSD gateway 520 of the back-end component 530. Additionally, in response to receiving the request for application data, the back-end component 530 may translate the request for application data from the non-mobile data format to an Internet protocol data format at step 910. The USSD gateway 520 may be part of a mobile carrier's network, and may convert the translated request from the format of the non-mobile data channel (e.g., USSD, Base64 encoded text from SMS channel, etc.) into a message containing instructions related to the request. The message containing instructions related to the request may then be transferred to the USSD application server 525. USSD application server 525 may subsequently translate the received message containing instructions related to the request to the required format for IP based communication. This may essentially be the reverse action of what the client component 515 previously performed.

The back-end component 530 may send the translated request for application data to third-party application server 550 associated with the application data 510 at step 915 (e.g., via USSD application server 525 of the back-end component 530). The USSD application server 525 may be responsible for interpreting the request from client component 515, and for making requests to appropriate third-party application servers and sending the request back to mobile device via gateway 520.

A response may be received by the back-end component 530 from the third-party application server 550 at step 920. The response may be received by, for example, the USSD application server 525 of the back-end component 530. The response may be sent in a second Internet protocol data format, which may have the same format as the Internet protocol data format, or a different format (e.g., TCP, DCCP, etc.). In some embodiments, USSD application server 525 may communicate with the third-party application server 550 over a secure channel, by, for example, encrypting the request prior to sending the request to the third-party application server 550. The third-party application server 550 may decrypt the request, and encrypt the packaged response before sending the response to the back-end component 530. The encrypted response may be decrypted by the USSD application server 525 before performing subsequent processing. Protocols that may be used for the encryption/decryption operations include Secure Sockets Layer ("SSL") or HTTP over Transport Layer Security ("HTTPS"), for example.

In response to receiving the response from the third-party application server 550, the back-end component 530 may translate the response from the second Internet protocol data format to the non-mobile data format at step 925, and send the translated response from the server via the non-mobile data channel at step 930. The translated response may be sent by, for example, the USSD gateway 520 of the back-end component 530.

Conventional USSD-based applications do exist, but these USSD-based applications are not modern mobile applications (i.e., Android, iOS etc) that include video and multimedia capabilities, and are instead limited to text/menu-based functionality. The described mobile application access platform solution allows the little-used USSD channel to be used in modern mobile applications so the applications can function as if mobile data is available.

Figure 6:
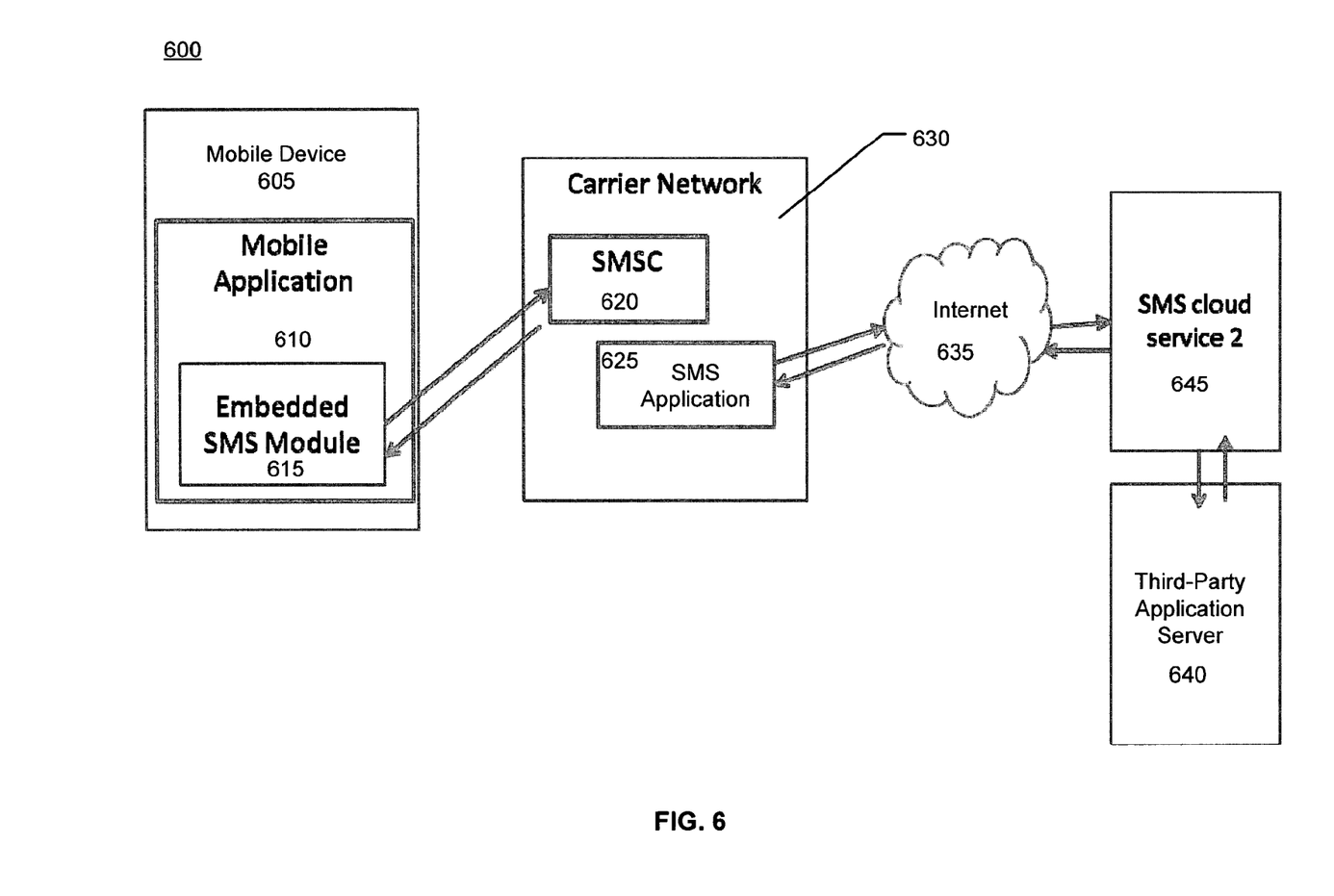
FIG. 6 shows a block diagram illustrating an exemplary embodiment of how the mobile application access platform's SMS component may function in an exemplary embodiment.

Another alternative channel is SMS, which communicates via a text-based format. The original data request may be converted to a text format such as base64 encoding and then packaged and sent via one or multiple SMS messages based on size. FIG. 6 shows a block diagram illustrating an exemplary embodiment of how the mobile application access platform's SMS component may function in an exemplary embodiment.

System 600 may function substantially similarly to system 500. System 600 may include mobile device 605, which include mobile application 610. The mobile application access platform client component may be implemented as an embedded non-mobile data communications module 615 (shown as "embedded SMS module") in the mobile application 610, or as a standalone mobile application. The mobile application access platform 600 may, in some embodiments, include three major components. First, a client component 615 that is included as part of the application 610, or runs standalone on the mobile devices. Second, a backend component 630 that runs inside a mobile carrier network to receive/parse/relay traffic from the mobile application 610. Third, the mobile application access platform may include a cloud service component 645 that supports logging, signaling and optionally communicates to application servers 640.

The embedded SMS module 615 may be configured to receive a request for data from the mobile application 610 on the mobile computing device 605, and automatically detect if mobile data is unavailable. When mobile data is unavailable, the SMS module 615 may automatically select an SMS channel based on availability of the SMS channel and bandwidth of the available SMS channel, translate the request for data into a format of the selected non-mobile data channel (i.e., SMS format), and transmit the translated request to the back-end server 630 via the selected non-mobile data channel (i.e., SMS).

The back-end component 630 may receive the translated request for data and re-translate the translated request for data in response to receiving the request for data. The re-translating may include converting the translated request for data from the format of the selected non-mobile data channel (for example, SMS, or any suitable format) to an Internet protocol data format. Back-end component 630 may package the re-translated request to mobile application access platform cloud service component 645 for processing.

SMS cloud service component 645 may runs on the Internet 635 and support logging, signaling and optionally communication to application servers 640. The SMS cloud service component may include a server or set of servers running code that receives re-translated requests for data from mobile application access platform back-end component 630 within the carrier network. SMS cloud service component 645 may un-package the re-translated request, and deciphers the intent of the request. SMS cloud service component 645 may further request on behalf of mobile communications device 605 to an intended target third-party application server 640 associated with the mobile application 610. The response from the third-party application server 640 may be received by SMS cloud service component 645, which may package the received response and sends the response to the back-end component 630 within the carrier network for the final transmission back to client device 605.

The back-end component 630 may receive the packaged response back from mobile application access platform cloud service 645 with the data from the intended target third-party application server 640 (e.g., via SMS application server 625). The SMS application server 625 may be responsible for interpreting the request from client component 615, making the request to the appropriate third-party application server 640, and sending the request back to the mobile device via SMSC 620. In some embodiments, SMS application server 625 may communicate with the mobile application access platform cloud service 645 over a secure channel, by, for example, encrypting the request prior to sending the request to the mobile application access platform cloud service 645. The mobile application access platform cloud service 645 may decrypt the request, and encrypt the packaged response before sending the response to the back-end component 630. The encrypted response may be decrypted by the SMS application server before performing subsequent processing. Protocols that may be used for the encryption/decryption operations include Secure Sockets Layer ("SSL") or HTTP over Transport Layer Security ("HTTPS"), for example.

The back-end component 630 may process the received response from mobile application access platform cloud service 645, by translating the received response into the selected non-mobile data format (e.g., SMS) for responding to client device. This is similar to the action performed by client device when it made the initial request. The back-end component 630 may also, in some embodiments, encrypt the received translated response before sending the translated response back to client device via the same alternative communication channel (e.g. SMS channel, by SMSC 620). The SMSC 620 is a short message service center, also known as an SMS gateway. The SMSC 620 may store, forward, convert, and deliver SMS messages to the SMS application server 645.

Some mobile applications use SMS technology to perform various functions—phone number verification, notification of events, communicate with friends, post status etc. The described mobile application access platform uses SMS in a way that is very different from the above examples. The mobile application access platform treats SMS as a base communication channel, so all mobile data requests can go through the SMS channel. The solution can often be done in a way that is transparent to the users.

Figure 7:
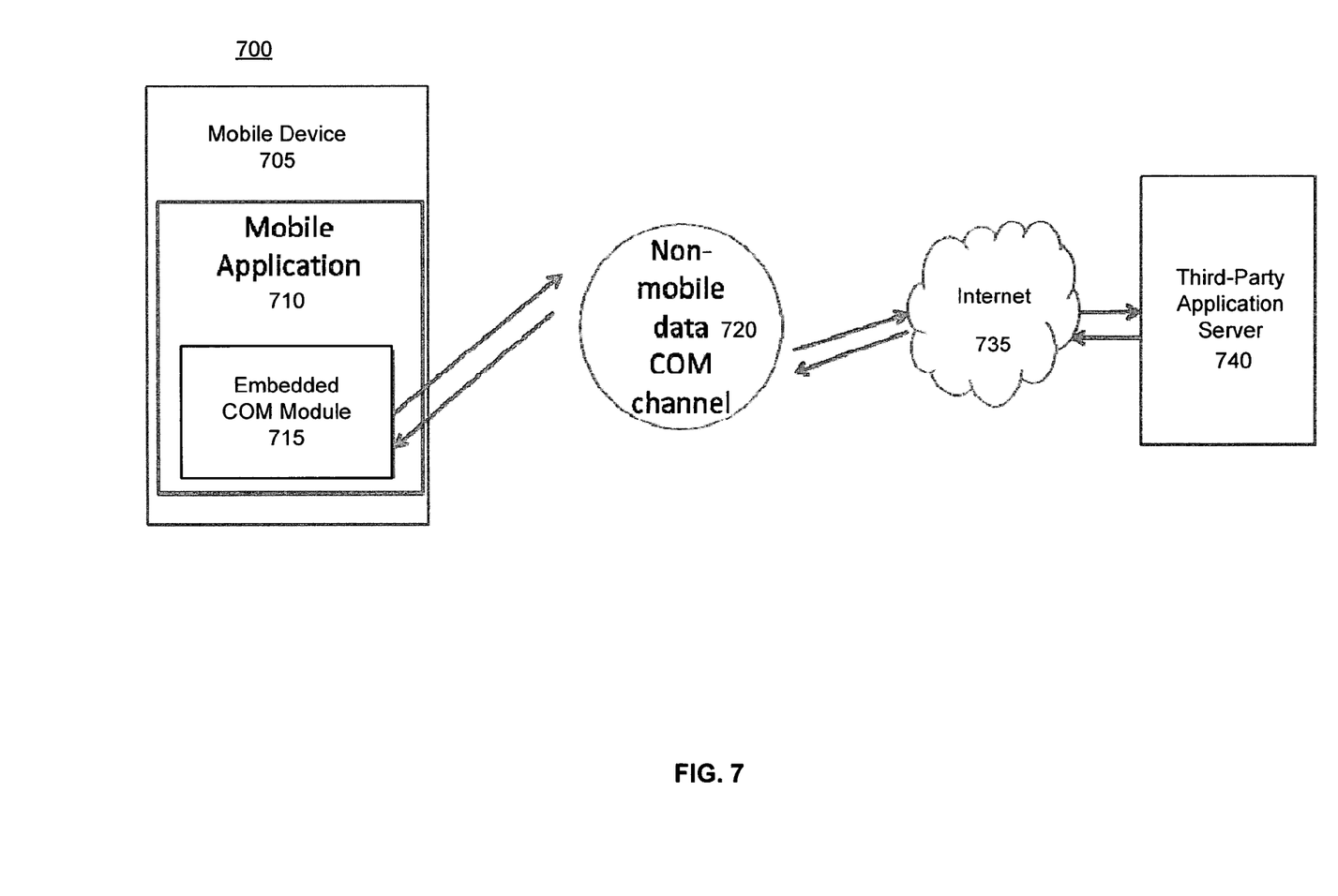
FIG. 7 shows a block diagram illustrating an exemplary embodiment of how the mobile application access platform's other potential non-mobile data channel components may function in an exemplary embodiment.

There are also other methods and non-mobile data channels that can potentially be used to communicate to application servers: A) Peer-to-peer to Internet, B) radio channel, C) voice channel, etc. FIG. 7 shows a block diagram illustrating an exemplary embodiment of how the mobile application access platform's other potential non-mobile data channel components may function in an exemplary embodiment. Another example of using non-mobile data channels is using voice to transfer digital data, by encoding the data into different sound frequencies supported by voice network, similar to dialup modems.

System 700 may function substantially similarly to systems 500 and 600. System 700 may include mobile device 705, which include mobile application 710. The mobile application access platform client component may be implemented as an embedded non-mobile data communications module 715 (shown as "embedded COM module") in the mobile application 710, or as a standalone mobile application. The mobile application access platform 700 may also include a backend component 720 (e.g., a non-mobile data COM channel module, as shown) that runs inside a mobile carrier network to receive/parse/relay traffic from the mobile application 710.

The embedded COM module 715 may be configured to receive a request for data from the mobile application 710 on the mobile computing device 705, and automatically detect if mobile data is unavailable. When mobile data is unavailable, the COM module 715 may automatically select an alternative non-mobile data channel based on availability of the non-mobile data channel and bandwidth of the available non-mobile data channel, and translate the request for data into a format of the selected non-mobile data channel. A pre-stored library may be used to convert the original request into the format of an alternative, non-mobile data channel. The COM module 715 may then transmit the translated request to the back-end component 720 via the selected non-mobile data channel.

The back-end component 720 may receive a translated request for application data, the translated request being sent by the mobile computing device 705 in a non-mobile data format over a non-mobile data channel. In response to receiving the request for application data, the back-end component 720 may translate the request for application data from the non-mobile data format to an Internet protocol data format. Back-end component 720 may translate the format of the alternative channel to the required format for IP based communication. This may essentially be the reverse action of what the client component 715 had performed.

The back-end component 720 may send the translated request for application data to third-party application server 740 associated with the application 710. A response may be received by the back-end component 720 from the third-party application server 740. In response to receiving the response from the third-party application server 740, the back-end component 720 may translate the response to the non-mobile data format, and send the translated response to the mobile device 705 via the non-mobile data channel. Potentially the data may also be decrypted if a form of security is enabled.

Figure 8:
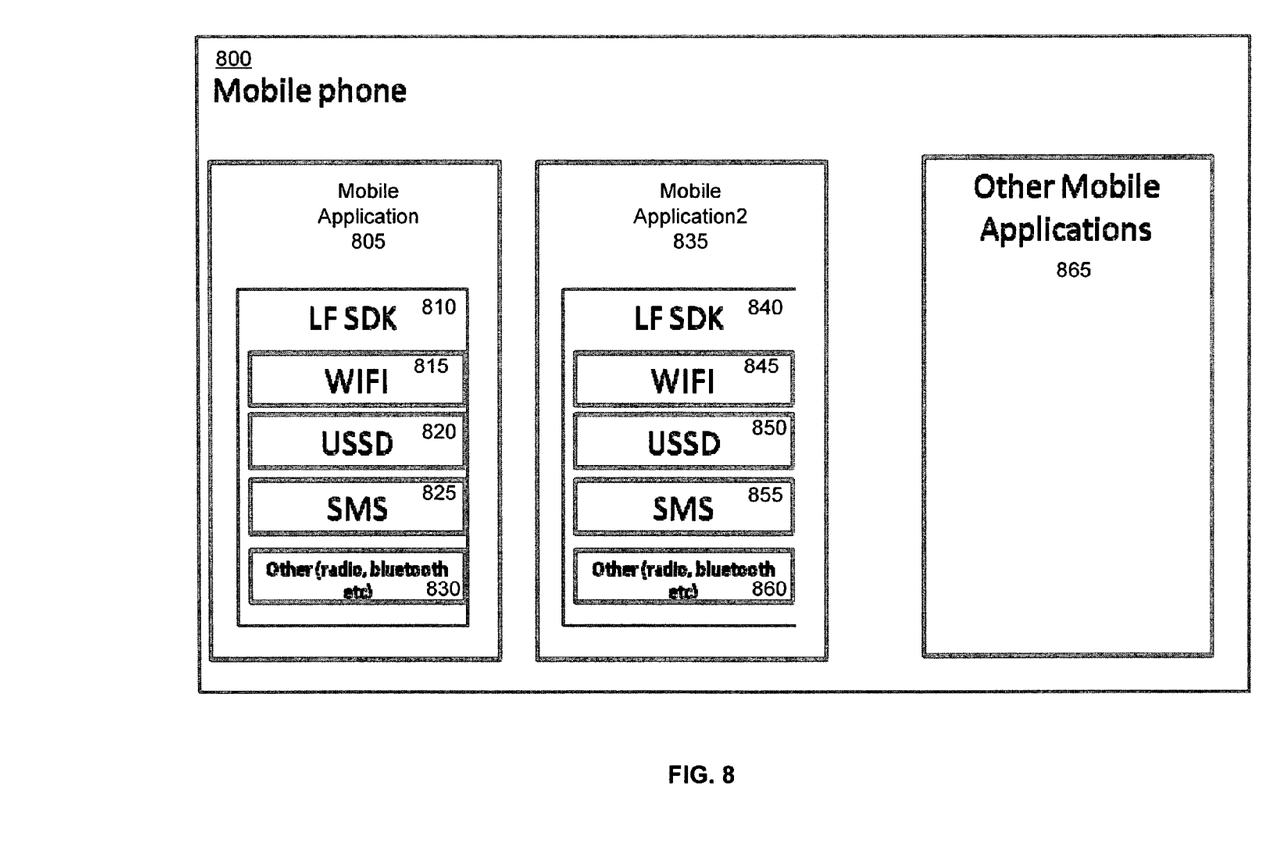
FIG. 8 shows a block diagram illustrating an exemplary mobile application access client, embedded as a SDK on a mobile device.

FIG. 8 shows a block diagram illustrating an exemplary mobile application access client, embedded in the mobile application 805 as a SDK 810 on a mobile device 800. The mobile device 800 may include a plurality of mobile applications 805 and 835 having embedded client components of the mobile application access platform, as well as other mobile applications 865 without embedded client components. With reference to FIG. 8, "LF SDK" refers to a software development kit of a mobile application access platform. The mobile application access platform SDK may introduce additional logic into the mobile application to permit the functionality described above, such as non-mobile data channel access to the mobile application. The SDK 810 may automatically select a non-mobile data channel to use when mobile data access is unavailable. For example, the SDK 810 may first determine if a sponsored WiFi connection is available. If a WiFi connection is available, then non-mobile data access may be provided to the mobile application 805 as described above, using WiFi module 815 of the SDK 810.

If WiFi is unavailable, the SDK 810 may attempt to utilize a USSD channel for non-mobile data access. If a USSD connection is available, then non-mobile data access may be provided to the mobile application 805 as described above, using USSD module 820 of the SDK 810. If USSD is not available or fails, the mobile application access platform may try to communicate via SMS to SMS-powered endpoints, which will in turn communicate with the application servers as in the USSD case described above. If a SMS connection is available, then non-mobile data access may be provided to the mobile application 805 as described above, using SMS module 825 of the SDK 810. Finally, if SMS is unavailable, the SDK may attempt to utilize other non-mobile data channels to provide functionality for mobile application 805, such as the examples listed above in the discussion of FIG. 7. If an alternative non-mobile data connection is available, then non-mobile data access may be provided to the mobile application 805 as described above, using COM module 830 of the SDK 810.

While the above-discussed examples have embedded client components within mobile applications, the mobile application access platform client component may also be implemented on a mobile communications device using a local VPN. The local VPN may be a separate application that serves as the device's VPN service. Once the VPN is activated, all traffic coming in and going out of the device may be funneled through the local VPN. The VPN application can determine whether to block or send traffic generated by apps on the mobile device to a remote server via mobile data channels or non-mobile data channels. The VPN application can be used together or separately with an SDK in some embodiments.

External leakage refers to the fact other applications or background services use up mobile data while user is using the sponsored application. Digital distribution platforms (such as the Google Play Store, or the Apple App Store), notification services, email applications and various location tracking apps all access data while in the background. Many smart phone users keep their mobile data turned off because of this type of leakage. The VPN app may advantageously prevent external leakage and allow the user to utilize selected mobile applications while avoiding external leakage, since VPN access may be limited to predetermined mobile applications. The VPN application allows the user and/or the mobile application access platform to control data access on a per mobile application basis via a configurable list of allowed applications. When the mobile data channel is unavailable, mobile applications may be blocked by the VPN Application, or allowed using non-mobile data channels in a way that is transparent to the application (i.e., no modification of any application is needed). The configurable list may be configured by the back-end server or by a user, in various embodiments.

Another advantage to local VPN embodiments is that no changes would be required to the device OS or other applications installed. The local VPN mobile application for the mobile application access platform may funnel traffic through a fixed set of IP addresses or servers and may tag the traffic with specific indicators. The mobile application access platform SDK, once installed in a mobile application, funnels all traffic from and to the application through a set of one or more back end servers. The VPN mobile application could make the need for an SDK unnecessary, and accordingly not require modifications to existing mobile apps. Once the VPN app is installed on the device, all mobile device app traffic can be routed to the appropriate places (i.e., application servers associated with the application) without the non-mobile data application access platform SDK.

Some of these non-mobile data channels may be slower than mobile data channels, so the mobile application may, in some embodiments, be limited to a portion of the functionality provided by the mobile application. In certain situations, mobile application content can be pre-cached, so applications may continue to provide greater functionality than the applications would if restricted to a slower non-mobile data channel and/or if used in an offline mode.

Figure 10:
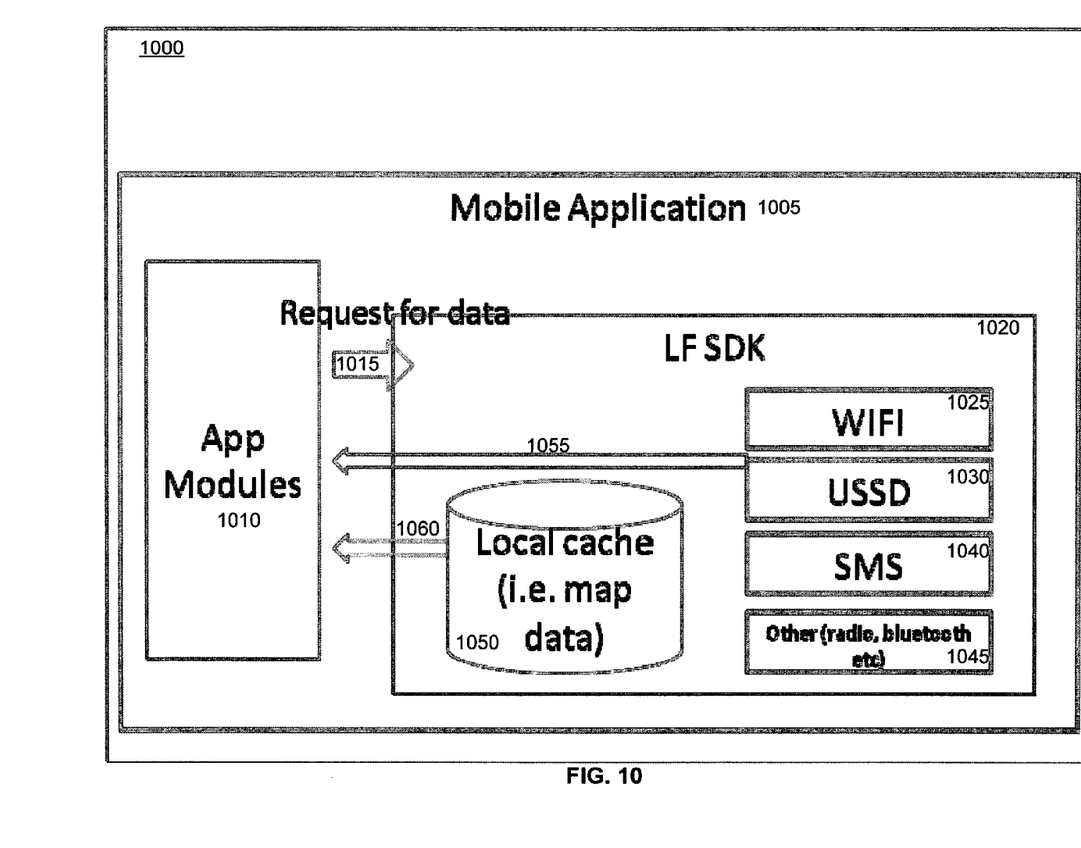
FIG. 10 shows a block diagram illustrating pre-caching of application data on a mobile application access client, according to embodiments of the platform.

FIG. 10 shows a block diagram illustrating pre-caching of application data on a mobile application access client component 1010 (embedded in mobile application 1005 of mobile device 1000), according to embodiments of the platform. A function that is called with a data request 1015 while the client has mobile data network connectivity. When function is called the data request may be made and the response from the data request may be stored locally on the client device storage area 1050. When there is no data connectivity, the same function call may return the stored response data at 1060 in response to the previously-made request when the previously-made request is repeated by the user. The action is transparent to the user with or without network connectivity. The pre-caching can be done by an SDK 1020 of the mobile application access platform integrated within the mobile application, or by a standalone VPN application.

The mobile application access platform may permit applications to automatically cache content. For example, a taxi application, such as the aforementioned Uber mobile application, can cache map data of the area that a user is most active in when the user has access to mobile data, the map data being a response to previously-made data requests for the map. With the map data of the local area pre-cached, a user can access a map of an area without the need for mobile data access. The user would first make a request for map data, which would be retrieved from the pre-cached data, then would make a second request for a taxi. The second request may be forwarded to the third-party application server using non-mobile data channels as described above. This may improve accessibility of the mobile application—if the user happens to be in a bad cell reception spot, the map will still load. This automatic pre-caching may also improve loading times of the mobile application—for example, loading a map from local cache may be a lot faster than downloading the map.

Applications may allow users to manually cache content using the mobile application access platform. For example, if a mobile device user knows they will travel from San Francisco to London, the user can pre-cache the London area map in their map mobile application, such as Google Maps, provided by Google, Inc., of Mountain View, Calif. This way when the user lands the map is available without the need for a mobile data connection.

Pre-caching mobile data for in-app access when mobile data is unavailable may have many useful applications. Map/Taxis/car sharing apps are a good pre-caching use case. There are many other use cases, however, where pre-caching, either automatic or user-initiated, may enhance non-mobile data channel (or offline) application use. Social apps such as Facebook/Twitter app can automatically or manually cache newsfeed so users can read newsfeed while they are offline. Combined with the other concepts described herein, users can even interact (i.e., "like" a post, comment on the post, etc.) with the cached newsfeed content. An e-commerce application can automatically or manually cache product catalogs that shoppers are interested in so they can browse/research product while offline. Combined with the other concepts described herein, users can interact (i.e. write a review, or even make a purchase via the e-commerce application) with the cached product catalogs. Document storage/retrieval applications can pre-cache all online documents so they can be edited while offline. Also, downloadable game content, such as game maps, items, customized player characters and the like, may be pre-cached to enhance offline play.

When the client device does not have network connectivity the mobile application access platform software on the client device may look for an ad-hoc wireless network. This ad-hoc wireless network may include other devices that contain the mobile application access platform software and have mobile data access. The client device may leverage the network connectivity of the peer connection.

When the client device has network connectivity the mobile application access platform software may enable an adhoc wireless network sharing mode with the permission of the user. The wireless connectivity between peer client devices can be made through a non-active data channel such as Bluetooth or WIFI when they are not used as the primary Internet data connection. E.g., Client 1 has network connectivity via 4G modem and shares Bluetooth for peer tethering.

Client 2 connects to Client 1 via Bluetooth and is able to access the interne through Client 1's 4G connection. Other static wireless hotspots can also be part of the adhoc wireless network that can be discovered while client device searches for an open data connection.

Figure 11:
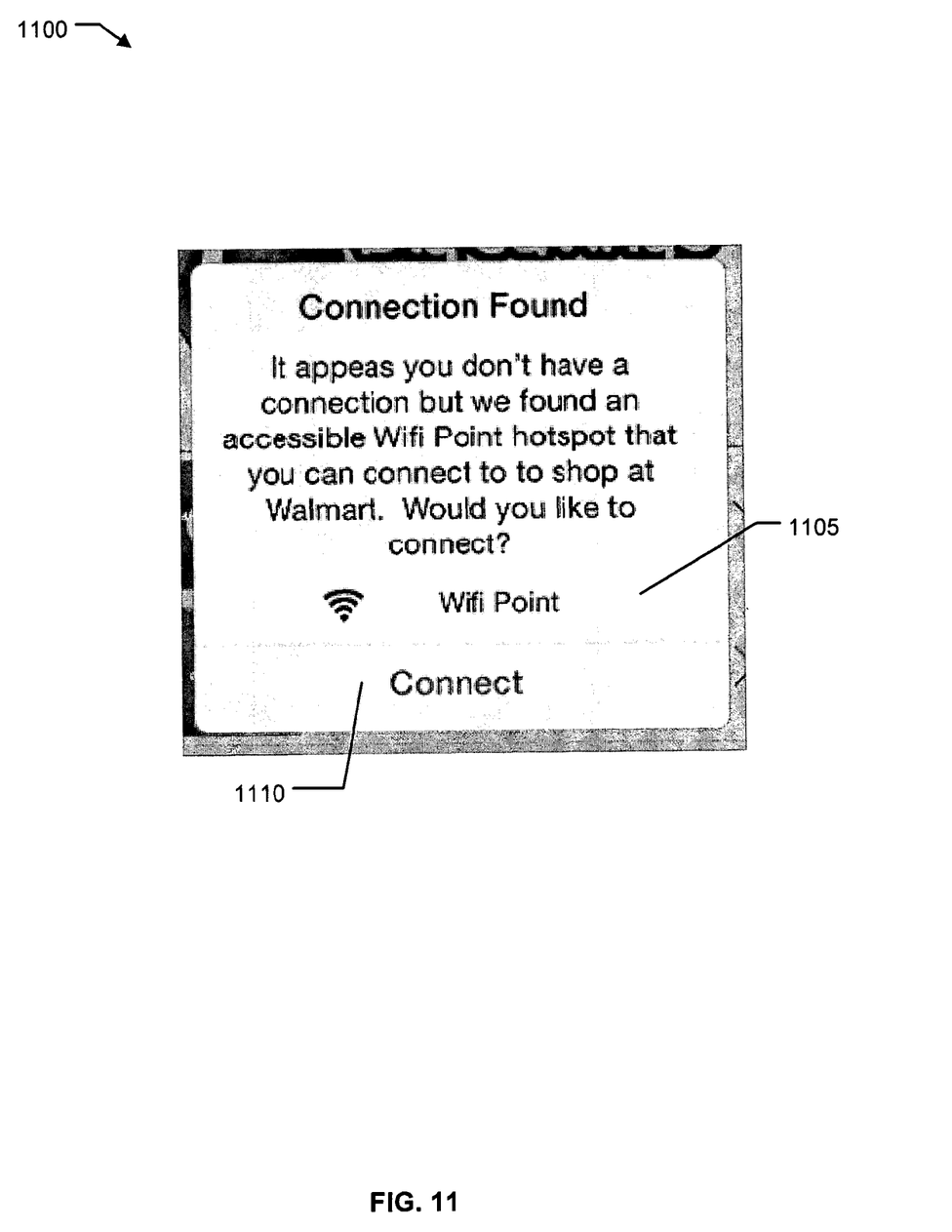
FIG. 11 is a screenshot illustrating an interface for selecting a non-mobile data communication channel for an application according to an exemplary embodiment of the platform.

The mobile application access platform technology may perform the above in a way that is transparent (i.e. automatically, without requiring user intervention) to the users of the mobile application. FIG. 11 is a screenshot illustrating an interface 1100 for selecting a non-mobile data communication channel for an application according to an exemplary embodiment of the platform. Once the client component is included in a mobile application, the application may take on new behavior when no data connection is detected. Instead of showing error messages or work in a limited offline mode, application may attempt to use other channels to communicate with the application server. It can look for Wi-Fi hotspots, connect to USSD channel or SMS channel. Interface 1100 displays this advantage, as a sponsored WiFi connection 1105 is presented to the user to select.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method for providing non-mobile data channel access to a mobile application on a mobile computing device, the method comprising:
    receiving, by a client component on the mobile computing device, a request for data from the mobile application, the request having a first Internet protocol data format;
    automatically detecting, by the client component, that mobile data is unavailable;
    automatically selecting, by the client component, a non-mobile data channel from a plurality of non-mobile data channels for the mobile application to communicate to an application server, the automatic selecting being based on availability of the selected non-mobile data channel and a determination that the selected non-mobile data channel has greater bandwidth than any other available non-mobile data channel, the selected non-mobile data channel being one of a USSD data channel, an SMS data channel, a radio channel, and a voice channel;
    translating, by the client component, the request for data having the first Internet protocol data format into a format of the selected non-mobile data channel; and
    transmitting, by the mobile computing device, the translated request for data to a back end server via the selected non-mobile data channel;
    pre-caching application data, by the client component, for the mobile application prior to the automatically detecting that mobile data is unavailable;
    determining, by the client component, if a pre-cached response to the received request for data from the mobile application is located in the pre-cached application data; and
    providing, by the mobile computing device, the pre-cached response to the received request for data from the mobile application in response to the received request for data when a pre-cached response is located in the pre-cached application data.

2. The method of claim 1, further comprising receiving a selection of the pre-cached application data prior to the pre-caching application data.

3. The method of claim 1, further comprising:
    receiving, by the mobile computing device, a response from the back-end server, the response being sent in the format of the selected non-mobile data channel;
    in response to receiving the response from the back-end server, translating the response, by the mobile computing device, from the format of the selected non-mobile data channel to the first Internet protocol data format of the mobile application; and
    displaying an interface, by the mobile computing device, based on the response from the back-end server.

4. The method of claim 1, wherein the method is implemented in a module embedded into the mobile application.

5. The method of claim 1, wherein the method is implemented by a second mobile application that is distinct from the data-requesting mobile application, wherein the receiving the request for data by the client component is performed by the second mobile application.

6. The method of claim 1, the automatic selecting being further based on cost of the non-mobile data channel.

7. The method of claim 6, the selected non-mobile data channel being an available non-mobile data channel having sufficient bandwidth to provide a response to the received request, the selected non-mobile data channel further having a lowest cost.

8. A method comprising:
    receiving, by a server, a request for application data, the request being sent by a mobile computing device in a non-mobile data format over a non-mobile data channel the mobile computing device sending the request for application data to the server only after
    (1) determining by the mobile computing device that the requested application data is not pre-cached application data stored on the mobile computing device, and
    (2) automatically detecting by the mobile computing device that mobile data is unavailable and then the mobile computing device automatically selecting the non-mobile data channel from a plurality of non-mobile data channels based upon availability of non-mobile data channel and a determination that the selected non-mobile data channel has greater bandwidth than any other available non-mobile data channel;
    in response to receiving the request for application data, translating the request for application data, by the server, from the non-mobile data format to a first Internet protocol data format;
    sending, by the server, the translated request for application data to an application server associated with the application data;
    receiving, by the server, a response from the application server, the response being sent in a second Internet protocol data format;
    in response to receiving the response from the application server, translating the response, by the server, from the second Internet protocol data format to the non-mobile data format; and
    sending, the translated response from the server via the non-mobile data channel to the mobile computing device.

9. The method of claim 8, the non-mobile data channel being an SMS channel, and the non-mobile data format being SMS.

10. The method of claim 8, the non-mobile data channel being a USSD channel, and the non-mobile data format being USSD.

11. The method of claim 8, the non-mobile data channel being a voice channel, and the non-mobile data format being sound data.

12. A system comprising,
a client component on a mobile computing device, the client component being configured to receive a request for data from a mobile application on the mobile computing device, the request having an Internet protocol data format, automatically detect if mobile data is unavailable, automatically select a non-mobile data channel from a plurality of non-mobile data channels based on availability of the non-mobile data channel and a determination that the selected non-mobile data channel has greater bandwidth than any other available non-mobile data channel, the selected non-mobile data channel being one of a USSD data channel, an SMS data channel, a radio channel, and a voice channel, translate the request for data having an Internet protocol data format into a format of the selected non-mobile data channel, and transmit the translated request to a back-end server via the selected non-mobile data channel;
the mobile computing device configured to pre-cache application data for the mobile application prior to the client component automatically detecting that mobile data is unavailable, determine if a pre-cached response to the received request for data from the mobile application is located in the pre-cached application data; and provide the pre-cached response to the received request for data from the mobile application in response to the request for data received by the client component when a pre-cached response is located in the pre-cached application data; and
a back-end component configured to receive the translated request for data, re-translate the translated request for data in response to receiving the request for data, the re-translating comprising converting the translated request for data from the format of the selected non-mobile data channel to a second Internet protocol data format, send the re-translated request for data to an application server associated with the mobile application, receive a response to the re-translated request for data, translate the received response to the format of the selected non-mobile data channel, and send the translated response to the client component on the mobile computing device.

13. The system of claim 12, the client component being further configured to receive the translated response, re-translate the translated response from the format of the selected non-mobile data channel to a native format of the mobile application, and cause an interface based on the re-translated response to be displayed on the mobile computing device.

14. The system of claim 12, the client component being an embedded SDK (Software Development Kit) within the mobile application.

15. The system of claim 12, the client component being a VPN application on the mobile computing device.

16. The system of claim 15, the VPN application including a configurable list of predetermined mobile applications for which non-mobile data communications may be utilized via the VPN application.

17. The system of claim 12, further comprising a cloud service component, the cloud service component being configured to unpack the re-translated request for data, extract the request for data, forward the request for data to an application server, receive the response from the application server, and send the response to the back-end component.

* * * * *